(12) United States Patent
Lapaille et al.

(10) Patent No.: US 6,539,214 B1
(45) Date of Patent: Mar. 25, 2003

(54) METHOD OF ESTIMATING THE SIGNAL TO NOISE RATIO OF A DIGITAL SIGNAL RECEIVED BY A RADIOCOMMUNICATIONS RECEIVER

(75) Inventors: Cédric Lapaille, Chatou (FR); Guillaume Calot, Versailles (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/393,458

(22) Filed: Sep. 10, 1999

(30) Foreign Application Priority Data

Feb. 4, 1999 (FR) .............................. 99 01295

(51) Int. Cl.[7] .............................. H04B 17/00
(52) U.S. Cl. .................. 455/226.3; 455/522; 455/67.3; 455/226.1; 370/318; 370/320
(58) Field of Search ............................ 455/67.3, 226.3, 455/522, 226.1, 226.2, 67.1, 516, 517, 500, 501; 370/316, 317, 318, 320, 335, 342; 375/227, 284, 346, 349

(56) References Cited

U.S. PATENT DOCUMENTS

| | | | |
|---|---|---|---|
| 5,317,599 A | | 5/1994 | Obata |
| 5,418,849 A | * | 5/1995 | Cannalire et al. ............ 370/290 |
| 5,463,662 A | * | 10/1995 | Sutterlin et al. ............. 375/351 |
| 5,506,869 A | | 4/1996 | Royer |
| 5,799,005 A | * | 8/1998 | Soliman ...................... 370/335 |
| 5,842,114 A | * | 11/1998 | Ozluturk ..................... 455/522 |
| 5,974,098 A | * | 10/1999 | Tsuda .......................... 375/340 |
| 5,978,657 A | * | 11/1999 | Suzuki ........................ 455/522 |
| 6,104,933 A | * | 8/2000 | Frodigh et al. ........... 455/226.3 |
| 6,118,767 A | * | 9/2000 | Shen et al. .................. 370/252 |
| 6,122,260 A | * | 9/2000 | Liu et al. ..................... 370/280 |

* cited by examiner

*Primary Examiner*—Nguyen T. Vo
*Assistant Examiner*—Edan Orgad
(74) *Attorney, Agent, or Firm*—Sughrue Mion, PLLC

(57) ABSTRACT

The invention concerns a method of estimating the noise power of a given digital signal ($cell_1$) assigned a code, this signal being received by a receiver (56) simultaneously with a plurality of other digital signals assigned different codes.

The noise powers are estimated for each of the received digital signals ($cell_1$, $cell_2$, . . . $cell_M$) assigned codes and there is assigned, to the given signal, the mean noise power (62) which is the ratio between, on the one hand, the sum of the estimated noise powers and, on the other hand, the total number M of received codes.

12 Claims, 2 Drawing Sheets

METHOD OF ESTIMATING THE SIGNAL TO NOISE RATIO OF A DIGITAL SIGNAL RECEIVED BY A RADIOCOMMUNICATIONS RECEIVER

BACKGROUND OF THE INVENTION

1. Field of the Invention

The invention relates to a method of estimating the signal to noise ratio of a digital signal received by a radiocommunications receiver.

It concerns more particularly a method of estimating such a signal to noise ratio in a radiocommunications system for which the communication resources are shared according to a plurality of codes.

2. Description of the Prior Art

It is known that, in a digital type telecommunications system, a large number of different communications can be transmitted simultaneously. This simultaneity is obtained by resorting to different codes and/or frequencies and/or time slots.

There will be considered here, by way of example, a telecommunications system in which a plurality of terminals communicate with a control station, notably by means of retransmission means on board a satellite. The inter-terminal communications are performed by means of the control station. Thus, the latter communicates simultaneously with a set of terminals. It is this multiplicity of simultaneous communications which makes it necessary to resort to shared code and/or frequency and/or time slot resources.

In this system, the resources are limited by the retransmission capacity of the equipment on board the satellite. It is therefore necessary to allocate, to each transmitter, the power which is just sufficient to satisfy the communications requirements, that is to say the power allowing the bit error rate to always be less than a required rate. In order to satisfy this requirement, it is ensured that, at any instant, the signal to noise ratio of the received signal is greater than a predetermined value.

This measurement of the signal to noise ratio is performed continuously since the propagation conditions can vary, in particular as a result of variations in the meteorological conditions. For example, rain causes a high attenuation of the received signal compared with a transmission in clear weather. It can also be pointed out that the propagation conditions can be degraded as a result of jitter which has its origin in multiple signal paths causing additive and subtractive combinations as well as maskings which occur when an antenna is following a moving source (the satellite) and obstacles are interposed on the path of the transmitted signal.

The accuracy of the measurement of the signal to noise ratio assumes great importance, since a low-accuracy measurement will lead to an excessive power allocated to each transmitter, which will reduce the communications capacity. On the other hand, if the measurement is accurate, there will be assigned to each transmitter the power just necessary for it, which makes it possible to maximize the communication resources.

The various methods used until now for measuring the signal to noise ratio provide a relatively poor accuracy.

The methods of estimating the signal to noise ratio which provide the best result are, in the case of digital signals, on the one hand, a correlation method and, on the other hand, a method of direct measurement of the received signal.

The first method (correlation) consists in correlating the received binary signal with a signal which is decoded, and then recoded. This is because it is known that a transmitted binary signal contains redundant information in order to allow a robust transmission of the information. For example, an ATM cell containing 424 bits is transmitted in 848 bits. The decoding consists in extracting the 424 useful bits and the coding consists of transforming the 424 useful bits into 848 bits intended to be transmitted. Thus, the received binary signal and the signal at the output of the coder have the same format and the same number of bits.

The correlation consists in performing a multiplication of the received signal S by the signal X at the output of the coder. The signal to noise ratio $\hat{\gamma}$ is determined from the mean value and the variance of this product $Z=X.S$ measured for a series of N samples. This signal to noise ratio is then the ratio between the square of the mean and twice the variance. This method is limited by the performance of the decoder. When the link is of poor quality, the decoder provides an erroneous result and the measurement provided is then not reliable. Thus, the estimated signal to noise ratio has a correct value only when its value is sufficiently high.

The second method (a direct measurement on the received signal S) consists in determining the absolute value $|s|$ of the samples and in estimating the signal to noise ratio from the mean and the variance of this absolute value of the samples, for example with the help of the following formulae:

$$\hat{\mu}_{|s|} = \frac{1}{N} \sum_i |si| \quad (1)$$

$$\hat{\sigma}^2_{|s|} = \frac{1}{N-3} \sum_i (|si| - \hat{\mu}_{|s|})^2 \quad (2)$$

$$\hat{\gamma} = \frac{\hat{\mu}^2_{|s|}}{2\hat{\sigma}^2_{|s|}} \quad (3)$$

In these formulae, $\hat{\mu}$ is the mean, $\hat{\sigma}^2$ is the variance and $\hat{\gamma}$ is the signal to noise ratio.

The signal to noise ratio being determined from an absolute value, the results are satisfactory only when this ratio has a sufficiently high value. This is because, as only the absolute value is considered, the negative values fold back on to the positive values and, if the signal to noise ratio approaches zero, this folding back leads to an impairment of the statistical properties of the original signal and the estimates of the mean (1) and variance (2) are no longer adapted to the resulting signal.

SUMMARY OF THE INVENTION

The invention provides a method of estimating the noise which reduces, to a great extent, the estimation variance where the received signal comprises a number of codes.

To that end, according to the invention, a noise power is estimated on all the received codes and the mean value of the noise is determined, this mean value being used for estimating the signal to noise ratio for each code.

The invention results from the observation that the noises observed for each code are uncorrelated although coming from the same random process.

If M is the spread factor, or number of codes, the noise estimation variance is divided by M compared with the case where the noise estimation is performed individually on each code, without taking the other codes into account.

Moreover, an estimation of the noise power can be performed even if the receiver for which the estimation is being performed does not receive any signals intended for it.

This is because this estimation can be carried out on the received codes which are intended for other receivers.

In order to estimate the signal to noise ratio from the noise thus estimated, the known methods of estimating means of signals can be resorted to.

In the case of a phase-modulated signal, notably with two or four states, the invention, according to another of its aspects, makes provision for estimating the mean and the variance of the signal $x_I^2+x_Q^2$, or the mean and the variance of the signals $x_I^2$ and $x_Q^2$ considered as one and the same random variable.

The invention provides a method of estimating the noise power of a given digital signal assigned a code, this signal being received by a receiver simultaneously with a plurality of other digital signals assigned different codes, which is characterised in that the noise powers are estimated for each of the received digital signals assigned codes, and in that there is assigned, to the given signal, the mean noise power which is the ratio between, on the one hand, the sum of the estimated noise powers and, on the other hand, the total number M of received codes.

The codes are for example orthogonal.

According to one embodiment, at least certain of the simultaneously received digital signals are intended for receiver(s) other than the one for which the noise power is being estimated.

In this case, the noise power is determined on all the digital signals received by the receiver which are assigned codes, this estimation being capable of being performed continuously, even in the absence of a code intended for the receiver.

The invention also provides a method of estimating the signal to noise ratio of a digital signal assigned a code, this signal being received by a receiver simultaneously with other digital signals assigned different codes, the noise power used for estimating this signal to noise ratio being the noise power determined by the noise power estimation method described above.

In this case, a mean value of the power of the received signal is estimated.

When the digital signals are phase modulated with n states, the estimation of the mean and the variance of the signal is, in one embodiment, performed on an estimate of the mean of the signals $x_I^2+x_Q^2$.

In this case, the signal to noise ratio $\hat{\gamma}$ can be estimated from the following relationship:

$$\hat{\gamma} = \frac{s^2}{4\sigma^2} = \frac{1}{2} \frac{\sqrt{\mu_y^2 - \sigma_y^2}}{\mu_y - \sqrt{\mu_y^2 - \sigma_y^2}}$$

a relationship in which $s^2+\mu_I^2+\mu_Q^2$, $\mu_I$ and $\mu_Q$ being the mean values of the variables $x_I$ and $x_Q$, $\sigma^2$ is the variance of these variables, and $\mu_y=2\sigma^2+s^2$ $\sigma_y^2=4\sigma^4+4\sigma^2 s^2$.

When the received digital signals are phase modulated with n states, the mean and the variance of the variables $x_I^2$ and $x_Q^2$ considered as one and the same random variable can also be estimated.

In the latter case, the signal to noise ratio $\hat{\gamma}$ can be determined from the following relationship:

$$\hat{\gamma} = \frac{\mu^2}{2\sigma^2} = \frac{1}{2} \frac{\sqrt{\mu_y^2 - \frac{\sigma_y^2}{2}}}{\mu_y - \sqrt{\mu_y^2 - \frac{\sigma_y^2}{2}}}$$

with:

$\mu_y = \sigma^2 + \mu^2$, $\sigma_y^2 = 2\sigma^4 + 4\sigma^2\mu^2$, $\mu$ being the mean common to the variables $X_I$ and $X_Q$ and $\sigma^2$ the variance of these variables $X_I$ and $X_Q$.

The invention also provides a method of determining the power assigned to a transmitter in which the power is determined in a manner such that, in the receiver, the signal to noise ratio is always at least equal to a reference value, which is characterised in that the signal to noise ratio of the receiver is estimated according to the method described above.

The invention also makes provision for applying the latter method of determining power assigned to a transmitter to a telecommunications system in which the transmitter and the receiver communicate by means of retransmission means on board an orbiting satellite.

Other characteristics and advantages of the invention will emerge with the description of certain of its embodiments, this description being produced with reference to the accompanying drawings.

DETAILED DESCRIPTION OF THE PREFERRED EMBODIMENT

Figure 1:
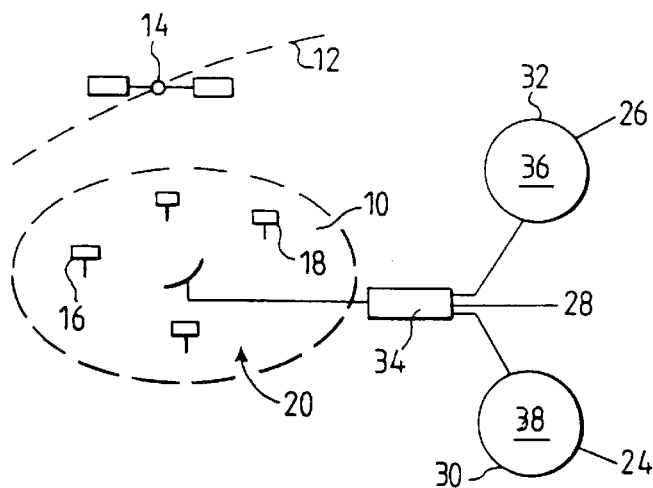
FIG. 1 is a diagram of a satellite telecommunications system to which the invention applies.

The example which will now be described in connection with the figures relates to a telecommunication system in which the surface of the earth is divided into zones 10 (FIG. 1), only one of which has been depicted in the figure. In each zone there is found, on the one hand, a central control or connection station 20, and, on the other hand, terminals or subscriber sets 16, 18, etc.

The terminals 16, 18, etc. communicate with one another by means of retransmission equipment on board a satellite 14 in low or medium orbit. In the example, the altitude of the satellite is around 1,500 km. This satellite 14 moves in an orbit 12 in which there are other satellites. In order to cover the earth, or a large part thereof, a number of orbits 12 are provided.

When the satellite 14 loses sight of the zone 10, the equipment in the next satellite (not shown), for example in the same orbit 12, takes over the communication. Below, for simplification, the word "satellite" will sometimes be used for the equipment on board thereof.

The control and connection station 20 provides the management of the communications between the terminals 16, 18, etc. In particular, it allocates frequency, power and code resources for each of the terminals. To that end, this station 20 communicates with each of the terminals, also by means of the satellite 14.

The inter-terminal communications are performed by means of the station 20. In other words, when the terminal 16 communicates with the terminal 18, the terminal 16 sends the data to the station 20 by means of the satellite and the station 20 retransmits these data to the terminal 18, also by means of the satellite.

The station 20 is connected to a terrestrial network 22, of the ATM type in the example. Thus, this station 20 is connected, by means of an ATM switch 34, to a broadband network 36, to a narrow-band network 38, and to servers 28. The narrow-band network 38 allows the connection of users 30 and servers 24. Similarly, the broadband network 36 allows the connection of users 32 and servers 26.

Such a telecommunication system of the asynchronous transmission type allows a high data rate with a large capacity and a small delay due to the transmission.

In an asynchronous network, notably of the ATM type, the data are in digital form and organized in packets or cells comprising, for the ATM standard, 384 data bits (or symbols) and 40 header bits (or symbols).

The problem which the invention aims to solve is to allocate, to each communication, from the control station 20 to a terminal 16, 18 and from a terminal 16, 18 to the control station, a power resource which is such that this power is that just necessary for the signal to noise ratio to meet the specifications. Thus, the communications will have a required quality of service guaranteeing a bit error rate lower than a predetermined limit without excessive power consumption. This is because the transmitted power must be that which is just necessary, since the power available in the satellite is limited and, if a communication requires more power, that excess comes by reducing the power allocated to the other communications.

Furthermore, the terminals being mass-marketed devices whose price must be as low as possible, it is preferable that their power is limited.

In order to adjust the transmission power, the signal to noise ratio is determined at reception and the transmission power is adjusted so that this signal to noise ratio is equal to a reference value. The invention concerns more precisely the estimation of the noise and the estimation of, the signal to noise ratio.

In the case of a satellite transmission system, the adjustment of the transmission power, and therefore the estimation of the signal to noise ratio, has a particular importance, since the power received by the receivers can vary to a great extent, notably because of variations in the propagation conditions due to random changes in the meteorological conditions. In particular, the propagation is degraded substantially in the event of rain compared with clear weather. The propagation is also degraded as a result of jitter and maskings.

The propagation conditions can also introduce noise and the noise source can, itself, have characteristics which vary. Besides thermal noise, the causes of noise are, notably, interference due to the use of the same transmission frequencies for neighbouring zones, or jamming by other transmission systems.

According to a first aspect of the invention, a noise estimation method is provided which is particularly accurate where the cells are assigned codes such as orthogonal codes.

A signal S transmitted from the station 20 to the terminal 16 or from the terminal 16 to the station 20 is a signal of the form $$S = \sum_{i=1}^{i=80} C_i cell_i \quad (4)$$

$C_i$ represents a code and $cell_i$ represents a cell. In this example, the number of codes is equal to 80.

Figure 2:
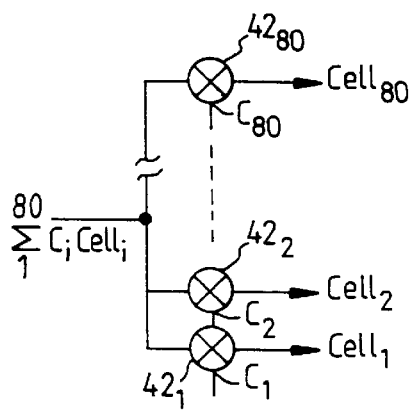
FIG. 2 is a diagram of a code separation device, known per se.

For the decoding, at reception, of this signal, the device depicted in FIG. 2 is used, which comprises multipliers 42$_1$, 42$_2$, ..., 42$_{80}$, each of which has a first input receiving the signal S and a second input to which a code $C_1$, $C_2$, ... or $C_{80}$ is applied.

Under these conditions, at the output of the multiplier 42$_i$, the cell $cell_i$ is obtained as a result of the orthogonality properties of the codes, that is to say:

$C_i \cdot C_j = 0$ if $i \neq j$, and $C_i \cdot C_j = 1$ if $i=j$.

It can thus be seen that each signal receiver or terminal receives all the M codes which are transmitted at a given moment. The invention consists of taking advantage of this simultaneous reception of M codes to significantly reduce the noise estimation variance. This is because it can be shown that the observed noise contributions for each code are uncorrelated although coming from the same random process.

Figure 3:
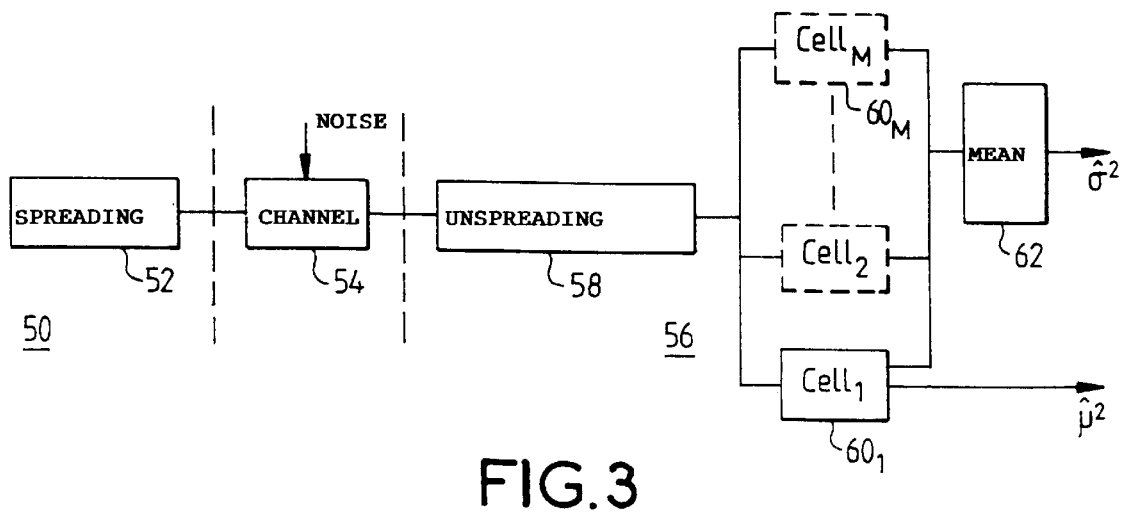
FIG. 3 is a diagram showing the noise estimation principle in accordance with the invention.

Thus, as depicted in FIG. 3, an estimation of the noise is performed on all the received cells, that is to say the noise powers for each code are summed and the arithmetic mean of the noise powers is worked out. It is this mean which is used for the estimation of the signal to noise ratio for a cell. It can thus be seen in FIG. 3 that the transmitter 50 assigns, to each of the transmitted cells, a code, all the codes being orthogonal. This code assignment is referred to as spreading (block 52).

The M cells assigned codes, respectively 1 to M, are transmitted by a channel 54 (radio transmission) which is a source of noise.

In the receiver 56, a sequence of unspreading 58 is performed as depicted in FIG. 2 and the noise power is determined for each cell (block 60$_1$ to 60$_M$). These noise power estimates are added up, and then the sum is divided by M. In FIG. 3, this operation is performed by the mean block 62. The result is the noise $\sigma^2$ which is used for estimating the signal to noise ratio for each cell.

The noise power estimation is performed by determining the variance of the received signals. The signal to noise ratio is obtained by estimating, in addition, the mean of the signals.

It may be seen that an accurate estimate of the noise is obtained, even if the receiver under consideration receives signals of which none is intended for it. In this case, the noise measurement can be used for the subsequent estimation of the noise of signals intended for the receiver.

Figure 4:
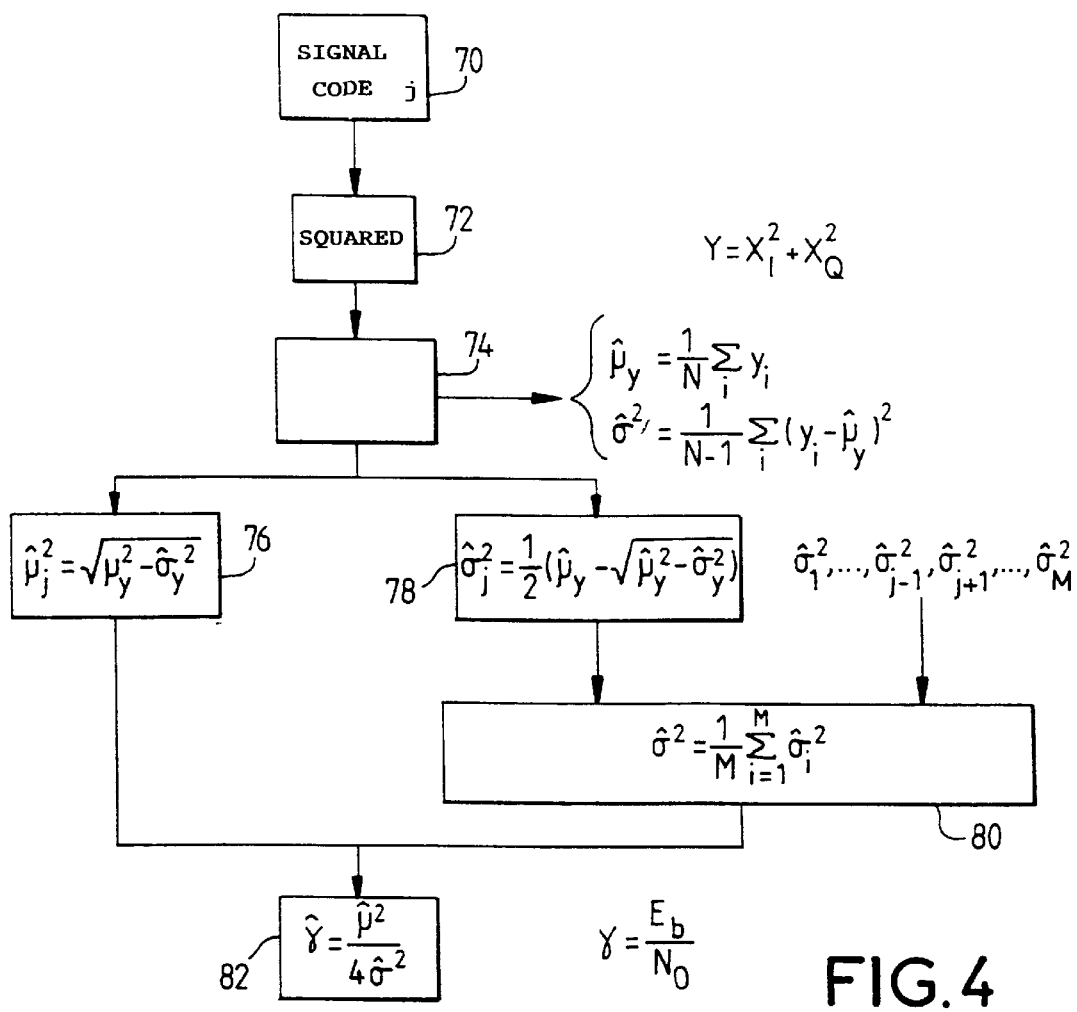
FIGS. 4 and 5 are diagrams showing embodiments of the method in accordance with the invention.
Figure 5:
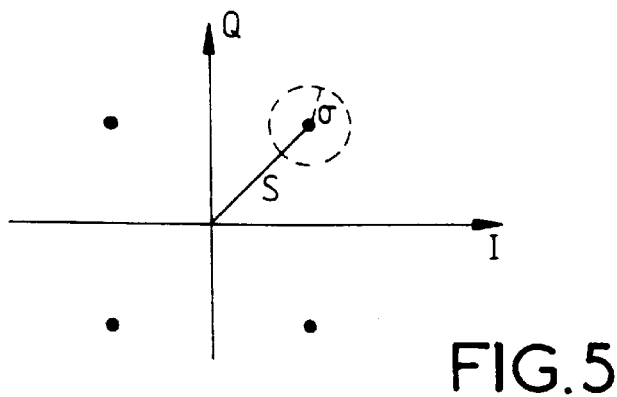

In the preferred embodiment of the invention which is depicted in FIGS. 4 and 5, the transmitted signals are phase modulated with two or four states.

The principle of such a modulation should be noted here. Two signals of the same frequency and the same constant amplitude are transmitted simultaneously. In a four-state phase modulation system, the phase between these two signals can take 4 values, for example $\pi/4$, $3\pi/4$, $5\pi/4$ and $7\pi/4$ and each of these phase differences represents a pair of binary numbers 00, 01, 10 or 11. In a two-state phase modulation, the phase can take only two values representing a "0" and a "1", respectively.

A phase-modulated signal is represented by a complex signal X(N) which can be represented by two real signals $X_I(N)$ and $X_Q(N)$ which are the projections of the complex signal along the axes, respectively I and Q.

If the propagation channel 54 is Gaussian, the signals $X_I(N)$ and $X_Q(N)$ correspond to Gaussian random variables of means $\mu_I$ and $\mu_Q$ and variance $\sigma^2$.

In order to determine the signal to noise ratio, in a first embodiment, the random variable Y(N) such that:

$$Y(N) = X_I(N)^2 + X_Q(N)^2$$

is considered.

The variables $X_I(N)^2$ and $X_Q(N)^2$ being Gaussian random variables of mean different from zero, the random variable $Y(N)$ follows a non-symmetrical $\chi^2$ law with two degrees of freedom.

In view of these remarks, the signal to noise ratio of the phase-modulated signal can be determined by estimating the mean and the variance of $Y(N)$. To that end, the following relationships are used:

$$\mu_y = 2\sigma^2 + s^2 \quad (6)$$

$$\sigma_y^2 = 4\sigma^4 + 4\sigma^2 s^2 \quad (7)$$

with $s^2 = \mu_I^2 + \mu_Q^2$ (8)

$S^2$ and $\sigma^2$ can thus be expressed as a function of $\mu_y$ and $\sigma_y^2$. Under these conditions, the signal to noise ratio $\hat{\gamma}$ has the value:

$$\hat{\gamma} = \frac{s^2}{4\sigma^2} = \frac{1}{2} \frac{\sqrt{\mu_y^2 - \sigma_y^2}}{\mu_y - \sqrt{\mu_y^2 - \sigma_y^2}}. \quad (9)$$

In a second embodiment, the signals $X_I(N)$ and $X_Q(N)$ are considered as constituting one and the same random variable which can be written as a vector $Y(N)$ with two components $X_I(N)^2$ and $X_Q(N)^2$:

$$y(N) = [x_I(N)^2 x_Q(N)] \quad (10)$$

This random variable follows a non-symmetrical $\chi^2$ law with 1 degree of freedom. This thus gives in this case:

$$\mu_y = \sigma^2 + \mu^2 \quad (11)$$

$$\sigma_y^2 = 2\sigma^4 + 4\sigma^2 \mu^2 \quad (12)$$

In these formulae, $\mu$ is the mean common to the two variables $X_I$ and $X_Q$.

The signal to noise ratio is then expressed by the following relationship:

$$\hat{\gamma} = \frac{\mu^2}{2\sigma^2} = \frac{1}{2} \frac{\sqrt{\mu_y^2 - \frac{\sigma_y^2}{2}}}{\mu_y - \sqrt{\mu_y^2 - \frac{\sigma_y^2}{2}}}. \quad (13)$$

FIG. 4 depicts the various steps of the method where the variable y is the sum of the squares of $x_I$ and $x_Q$.

The block 70 corresponds to the demodulated signal in a specific code j.

Next (block 72), this signal is squared. From this squared signal, the mean and the variance of the signal y are estimated (block 74). For this code j, the mean and the variance, that is to say the numerator (block 76) and the denominator (block 78) of the formula (9) above, are calculated. The variance is determined as indicated above in connection with FIG. 3, that is to say by working out the mean of the sum of the individual variances for each of the codes (block 80).

Next, the signal to noise ratio is estimated by using, in the block 82, the ratio of the mean value provided by the block 76 to four times the variance $\sigma^2$ provided by the block 80.

It must be noted that the method of estimating the noise power of a signal assigned a code can be used independently of the method of estimating the signal to noise ratio which was described above for a phase-modulated signal. In particular, the method of estimating the signal to noise ratio of the prior art, which was described above in the introduction to the description, could be resorted to. Of course, this method is not limited to a phase modulation.

Similarly, the method of estimating the signal to noise ratio for phase-modulated digital signals can be used independently of the method of estimating the noise power which was described in connection with FIG. 3.

What is claimed is:

1. A method of estimating the noise power of a given digital signal ($cell_1$) assigned a code, this signal being received by a receiver simultaneously with a plurality of other digital signals ($cell_1$, $cell_2$, ... $cell_m$) assigned different codes, the method comprising:

estimating the noise powers for each of the received digital signals assigned codes, and assigning to the given signal, a mean noise power which is the ratio between the sum of the estimated noise powers and the total number M of received codes.

2. A method according to claim 1, wherein the codes are orthogonal.

3. A method according to claim 1 or 2, wherein at least certain of the simultaneously received digital signals are intended for receiver(s) other than the one for which the noise power is being estimated.

4. A method according to claim 3, wherein the noise power is determined on all the digital signals received by the receiver which are assigned codes, this estimation being performed continuously, even in the absence of a code intended for the receiver.

5. A method of estimating the signal to noise ratio of a digital signal assigned a code, this signal being received by a receiver simultaneously with other digital signals assigned different codes, the noise power used for estimating this signal to noise ratio being the noise power determined by the method according to claim 1.

6. A method according to claim 5, wherein a mean value of the power of the received signal is estimated.

7. A method according to claim 6, wherein the digital signals being phase modulated with n states, the estimation of the mean and the variance of the signal is performed on an estimate of the mean of the signals $x_1^2 + x_Q^2$.

8. A method according to claim 7, wherein the signal to noise ratio $\gamma$ is estimated from the following relationship:

$$\gamma = s^2/4\sigma^2 = (\frac{1}{2}(\mu_y^2 - \sigma_y^2)^{1/2})/(\mu_y - (\mu_y^2 - \sigma_y^2)^{1/2})$$

a relationship in which $s^2 = \mu_1^2 + \mu_Q^2$, $\mu_I$, and $\mu_Q$ being the mean values of the variables $x_I$ and $x_Q$, $\sigma$ is the variance of these variables, and $\mu_y = 2\sigma^2 + s^2$, $\sigma_y^2 4\sigma^4 + 4\sigma^2 s^2$.

9. A method according to claim 6, wherein, the received digital signals being phase modulated with n states, the means and the variance of the variables $x_1^2$ and $x_Q^2$ considered as one and the same random variable are estimated.

10. A method according to claim 9, wherein the signal to noise ratio λ is determined from the following relationship:

$$\gamma = \mu^2/2\sigma^2 = \frac{1}{2}((\mu_y^2 - (\sigma_y^2/2)))^{1/2}/(\mu_y - (\mu_y^2 - \sigma_y^2/2)^{1/2}$$

with: $\mu_y = \sigma^2 + \mu^2$, $\sigma_y^2 = 2\sigma^4 + 4\sigma^2 \mu^2$, $\mu$ being the mean common to the variables $x_1$ and $x_Q$ and $\sigma^2$ the variance of these variables $x_1$ and $x_Q$.

11. A method of determining the power assigned to a transmitter in which the power is determined in a manner such that, in the receiver, the signal to noise ratio is always at least equal to a reference value, wherein the signal to noise ratio of the receiver is estimated according to any of claims 6 to 10.

12. Application of the method according to claim 11 to a telecommunications system in which the transmitter and the receiver communicate by means of retransmission means on board an orbiting satellite.

* * * * *